(12) United States Patent
Cieler et al.

(10) Patent No.: US 11,021,060 B2
(45) Date of Patent: Jun. 1, 2021

(54) METHOD FOR THE AUTOMATED GUIDING OF A MOTOR VEHICLE OCCUPIED BY A DRIVER AND FOR THE INFORMATION OF THE DRIVER

(71) Applicant: Continental Automotive GmbH, Hannover (DE)

(72) Inventors: Stephan Cieler, Frankfurt (DE); Guido Meier-Arendt, Langen (DE); Heidi von Bychowski, Bad Homburg (DE); Benjamin Mathe, Mainz (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/767,928

(22) PCT Filed: Oct. 14, 2016

(86) PCT No.: PCT/EP2016/074724
§ 371 (c)(1),
(2) Date: Apr. 12, 2018

(87) PCT Pub. No.: WO2017/064256
PCT Pub. Date: Apr. 20, 2017

(65) Prior Publication Data
US 2018/0304750 A1 Oct. 25, 2018

(30) Foreign Application Priority Data
Oct. 16, 2015 (DE) ...................... 10 2015 220 249.6

(51) Int. Cl.
*B60K 37/06* (2006.01)
*B60W 10/20* (2006.01)
*B60W 50/14* (2020.01)

(52) U.S. Cl.
CPC ............. *B60K 37/06* (2013.01); *B60W 10/20* (2013.01); *B60W 50/14* (2013.01); *B60K 2370/186* (2019.05); *B60W 2050/146* (2013.01)

(58) Field of Classification Search
CPC combination set(s) only.
See application file for complete search history.

(56) References Cited

U.S. PATENT DOCUMENTS 8,477,108 B2   7/2013   Wäller et al.
8,615,333 B2   12/2013  Giebel et al.
(Continued)

FOREIGN PATENT DOCUMENTS

CN   202454042 U    9/2012
CN   102815273      12/2012
(Continued)

OTHER PUBLICATIONS

DE102008061649, Machine Translation (Year: 2008).*
Office Action dated Mar. 20, 2019 issued in Korean Patent Application No. 10-2018-7013797.

*Primary Examiner* — Abby Y Lin
*Assistant Examiner* — Renee LaRose
(74) *Attorney, Agent, or Firm* — Cozen O'Connor

(57) ABSTRACT

A method for guiding a motor vehicle occupied by a driver during a vehicle journey in an automated manner by a driver assistance system includes: displaying, on an optical display apparatus of the driver assistance system, to the driver information from the driver assistance system relevant to the journey; and displaying the information relevant to the journey on the optical display apparatus by a plurality of different display pages assigned to different information classes. The display pages are displayed sequentially and in a stipulated order.

4 Claims, 5 Drawing Sheets

(56) References Cited

U.S. PATENT DOCUMENTS

| | | | |
|---|---|---|---|
| 9,308,914 B1 * | 4/2016 | Sun | B60K 28/06 |
| 9,547,173 B2 | 1/2017 | Alaniz et al. | |
| 2015/0284009 A1 * | 10/2015 | Cullinane | B60K 35/00 |
| | | | 701/23 |
| 2017/0021765 A1 * | 1/2017 | Mori | B60Q 9/00 |

FOREIGN PATENT DOCUMENTS

| | | |
|---|---|---|
| CN | 202847605 U | 4/2013 |
| CN | 103481781 | 1/2014 |
| CN | 104978107 | 10/2015 |
| DE | 10 2008 061649 A1 | 12/2009 |
| DE | 10 2010 063792 A1 | 6/2012 |
| DE | 1 2014 220053 A1 | 7/2015 |
| EP | 2397357 | 12/2011 |
| JP | 2008-108004 | 5/2008 |
| JP | 2012-180059 | 9/2012 |
| JP | 2014-151806 | 8/2014 |
| JP | 2015-094687 | 5/2015 |
| JP | 5728701 B2 | 6/2015 |
| JP | 2015-141478 | 8/2015 |
| JP | 2017-026417 | 2/2017 |
| KR | 20110009179 | 1/2011 |
| KR | 20130067278 | 6/2013 |
| KR | 20150083929 | 7/2015 |
| WO | WO 2009 024400 A1 | 2/2009 |
| WO | WO 2015/032557 A2 | 3/2015 |
| WO | WO 2015/032557 A3 | 4/2015 |

* cited by examiner

METHOD FOR THE AUTOMATED GUIDING OF A MOTOR VEHICLE OCCUPIED BY A DRIVER AND FOR THE INFORMATION OF THE DRIVER

CROSS-REFERENCE TO RELATED APPLICATIONS

This is a U.S. national stage of application No. PCT/EP2016/074724, filed on 14 Oct. 2016, which claims priority to the Germany Application No. 10 2015 220 249.6 filed 16 Oct. 2015, the content of both incorporated herein by reference.

BACKGROUND OF THE INVENTION

1. Field of the Invention

The invention relates to a method for guiding a motor vehicle occupied by a driver in an automated manner by a driver assistance system, wherein information relevant to the journey from the driver assistance system is displayed to the driver on an optical display apparatus. The invention also relates to a motor vehicle for carrying out an above-mentioned method, wherein the motor vehicle has a driver assistance system for guiding the motor vehicle in an automated manner and an optical display apparatus.

2. Related Art

Various methods for guiding motor vehicles occupied by a driver in an automated manner by a driver assistance system are already known. The methods for guiding the motor vehicle in an automated manner are usually distinguished and delimited with respect to one another according to their degree of automation.

According to one known delimitation of the methods with respect to one another, in the case of a method for guiding a motor vehicle in a highly automated manner, the driver assistance system takes over the lateral and longitudinal guidance of the motor vehicle for a certain period in specific situations. In the case of a method for guiding a motor vehicle in a fully automated manner, the driver assistance system completely takes over the lateral and longitudinal guidance of the motor vehicle in a defined application. In the case of fully automated guidance, the driver assistance system asks the driver to cake over the driving task, that is to say the guidance of the motor vehicle, with a sufficient time reserve before leaving the application. In the case of highly automated guidance, the takeover request is made if necessary and with a sufficient time reserve. In order to take over the driving task, the driver must be ready to take over in both cases, that is to say both during highly automated guidance and during fully automated guidance of the motor vehicle by the driver assistance system. The highly automated or fully automated guidance of the motor vehicle is also referred to as guidance of the motor vehicle with a higher automation level. In both cases mentioned above, highly automated guidance and fully automated guidance of the motor vehicle, the driver need not monitor the driver assistance system.

In contrast, the driver must permanently monitor the driver assistance system in methods having a lower automation level, namely a method for guiding the motor vehicle in a partially automated manner by a driver assistance system or a method for guiding the motor vehicle only in an assisted manner by a driver assistance system. Both in the case of partially automated guidance of the motor vehicle by a driver assistance system and in the case of only assisted guidance of a motor vehicle by a driver assistance system, the driver must be ready at any time to completely take over the guidance of the vehicle.

It may be desirable, not only in methods for guiding the motor vehicle with a lower automation level but also in methods for guiding the motor vehicle with a higher automation level, to provide the driver with information relevant to the journey, with the result, for example, that the driver's confidence in the reliability of the method can be increased.

Various methods and motor vehicles mentioned at the outset are already known in this context. In this case, the information relevant to the journey is displayed on a display apparatus in the form of a screen. Depending on the type of information displayed, the display is carried out by different screen pages, which can be selected and chosen by an operator, in particular the driver of the motor vehicle, in different display menus of the display apparatus dependent on the type of information. Changing the type of displayed information regularly requires a change in the selection of the display menu and its specific choice by the operator.

SUMMARY OF THE INVENTION

A first object of the invention relates to a method of the type mentioned at the outset that informs the driver in a simple and clear manner. A second object of the invention is producing a motor vehicle for carrying out the method.

The first object may be achieved, according to an aspect of the invention, with a method in which information relevant to the journey is displayed on the display apparatus by a limited number of different display pages assigned to different information classes, wherein the display pages are displayed sequentially and in a stipulated order.

The information relevant to the journey and displayed to the driver comprises, for example, information relating to the course of the road and/or information relating to the traffic environment of the motor vehicle and/or information relating to the driver condition. The information relating to the course of the road is than displayed, for example, by a display page assigned to a road map information class. The information relating to the traffic environment is displayed, for example, by a display page assigned to a vehicle environment information class. The information relating to the driver condition is displayed, for example, by a display page assigned to a driver information class. The respectively displayed information relevant to the journey is contained in the respective display page.

The sequential display of the display pages is particularly advantageous in one aspect of the invention, as a result of which time-consuming and possibly complicated navigation through display menus and in menu trees can be avoided. There is also no need for possibly laborious access to different display systems of the motor vehicle using the invention. Display pages from different information classes are immediately displayed to the user, namely the driver of the motor vehicle, without the user having to change a menu selection or a display menu, for example.

As a result of the display pages being sequentially displayed in a stipulated, that is to say predefined, order, it is additionally also very simple for the user to bestow his attention on one or more particular information classes that are particularly important to hits. Sequentially displaying the display pages also means that a plurality of display pages are not displayed at the same time, for example in the form of a plurality of display windows arranged beside one another and/or in an overlapping manner, but rather only one individual display page is ever displayed at any time, thus resulting in a display of the information relevant to the journey that is very clear and can be easily understood by the driver. This is also supported by the fact that the number of different display pages is limited according to the invention. For example, the number of different display pages may be in the range of three to ten display pages; for example, the number of different display pages may be six.

Since information relevant to the journey is displayed and therefore made available to the driver of the motor vehicle with the aid of the method according to an aspect of the invention without a relatively large amount of effort for the driver and in a very simple manner, the driver's confidence in the driver assistance system and, in particular, in the automated guidance of the motor vehicle by the driver assistance system can be considerably increased with the invention. For examples the driver can obtain an overview of environment objects captured by an environment capture device of the motor vehicle in order to be assured that vehicle controls and therefore also the automated guidance of the motor vehicle, are operating reliably.

Since display pages assigned to different information classes are arranged in a stipulated order behind one another, the driver can access contents respectively relevant to him in an intuitive manner and possibly with a minimum amount of operating effort. In this case, the invention makes it possible for the driver to quickly change between a display of infotainment information, road map information, vehicle environment information and driver information, for example.

The sequential display of the display pages can preferably be carried out in a flowing manner, that is to say the transitions between the display pages can preferably be flowing. In principles however, a change between the display pages, for example in the form of turning over from one display page to the following display page in the case of the sequential display of the display pages, is also conceivable.

The display apparatus may preferably have a screen on which the information relevant to the journey is displayed by the display pages. The display pages can then also be referred to as screen pages.

Additional advantageous developments of the invention are specified herein.

It would be conceivable for the display pages to be sequentially displayed in an automatic sequence. In contrast, according to one advantageous development of the invention, actuation of an input element causes a change from the display page displayed on the display apparatus to an adjacent display page in the order. The change to the adjacent display page can preferably be carried out either in a forward direction or in a reverse direction, with the result that it is possible to change to any of the two display pages adjacent to a display page in an order, for example depending on the actuation of the input element (for example by rotating the input element to the right or left in the case of a rotary input element). The input element can be advantageously actuated by the driver of the motor vehicle and so makes it possible for the driver to receive the respectively desired information immediately and at very short notice.

In order to increase the confidence, in particular of the driver of the motor vehicle, in a reliability of the method for guiding the motor vehicle in an automated manner, it is particularly advantageous if, according to another advantageous development of the invention, an environment object in a traffic environment of the motor vehicle is captured by an environment capture device of the motor vehicle, and the environment object is displayed on the display apparatus on a display page of the sequentially displayed display pages.

According to another advantageous development of the invention, there are at least three sequentially displayed display pages, wherein one display page of the three display pages is assigned to a road map information class, another display page of the three display pages is assigned to a vehicle environment information class and a further display page of the three display pages is assigned to a driver information class, wherein the display page assigned to the road map information class is arranged first in the order of the display pages, then the display page assigned to the vehicle environment information class and then the display page assigned to the driver information class. The road map information class may also more generally be a navigation information class, for example. The vehicle environment information class also comprises the traffic environment of the motor vehicle, in particular. The driver information class may also more specifically be a driver condition or a driver health condition information class, for example.

On account of the predefined order of the different display pages, the driver of the motor vehicle is advantageously guided, starting from an item of journey-relevant information relating to the route (road map), via an item of journey-relevant information relating to the traffic environment (vehicle environment), for example an item of information relating to environment objects in the traffic environment, to an item of journey-relevant information relating to the driver himself (driver), for example an item of information relating to driver fatigue and/or a driver heart rate. In the order of the display pages, zooming is therefore carried out from a comparatively large-scale display into the driver. The three display pages mentioned need not directly adjoin one another in the order, but rather another display page or a plurality of further display pages increasing a level of detail of the displayed information relevant to the journey, for example, may also be respectively arranged between the display pages.

According to another advantageous development of the invention, a driver condition of the driver is captured by a driver condition capture device of the motor vehicle, and the driver condition is displayed on the display apparatus on a display page of the sequentially displayed display pages. The driver of the motor vehicle is therefore given the opportunity, in a simple and clear manner, to acquire, additionally and in a manner incorporated into the sequence of the sequential display, an item of journey-relevant information relating to his own condition, for example fatigue, which information can be used, for example, to assess whether the driver is able to monitor the driver assistance system and/or to take over the guidance of the motor vehicle from the driver assistance system.

The second object mentioned above may be achieved, according to an aspect of the invention, with a motor vehicle of the type mentioned at the outset, wherein the driver assistance system is connected to the display apparatus for the purpose of transmitting data, and wherein the display apparatus is designed such that it displays information relevant to the journey from the driver assistance system by a limited number of different display pages assigned to different information classes, and displays the display pages sequentially and in a stipulated order.

The display apparatus may preferably have a screen on which the display pages containing the information relevant to the journey are displayed. The information relevant to the journey and displayed on the display apparatus by the display pages is transmitted, as data, from the driver assistance system to the display apparatus via a connection between the driver assistance system and the display apparatus.

BRIEF DESCRIPTION OF THE DRAWINGS

Exemplary embodiments of the invention are illustrated in the drawings and are described in more detail below. In a diagrammatic and schematic illustration. In the drawings.

DETAILED DESCRIPTION OF THE PRESENTLY PREFERRED EMBODIMENTS

In all of the figures, respectively corresponding elements are provided with the same reference symbols.

FIGS. 1 to 6 illustrate a method for guiding a motor vehicle occupied by a driver in an automated manner by a driver assistance system, wherein information relevant to the journey from the driver assistance system is displayed to the driver on an optical display apparatus. In this respect, FIGS. 1 to 6 show a limited number of different display pages 1, 2, 4, 6, 8, 10, six display pages 1, 2, 4, 6, 8, 10 in this exemplary embodiment, which are assigned to different information classes and are displayed to the driver on the display apparatus (not illustrated any further here) sequentially and in a stipulated order.

Figure 1:
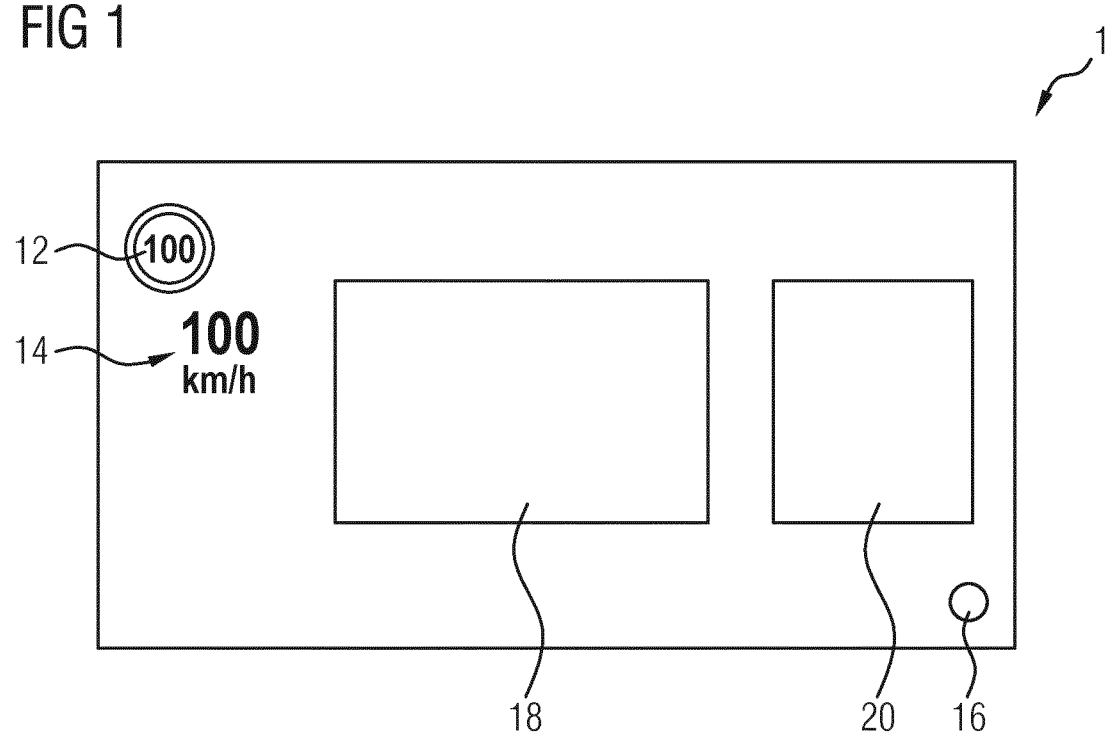
FIG. 1 shows a first display page displayed on a display apparatus.

A first display page 1, illustrated in FIG. 1, is assigned to an infotainment information class. A current driving speed of the motor vehicle is displayed in a speed display field 14 on the first display page 1 in addition to a speed symbol 12 for a maximum permissible speed for a road section currently being traveled on by the motor vehicle, which maximum speed is captured by a traffic sign recognition device of the motor vehicle. A switched-on symbol 16, which signals to the driver that a function of the automated guidance of the driver assistance system is activated, is also displayed in a condition display region arranged at the bottom right of the display page 1.

Figure 7:
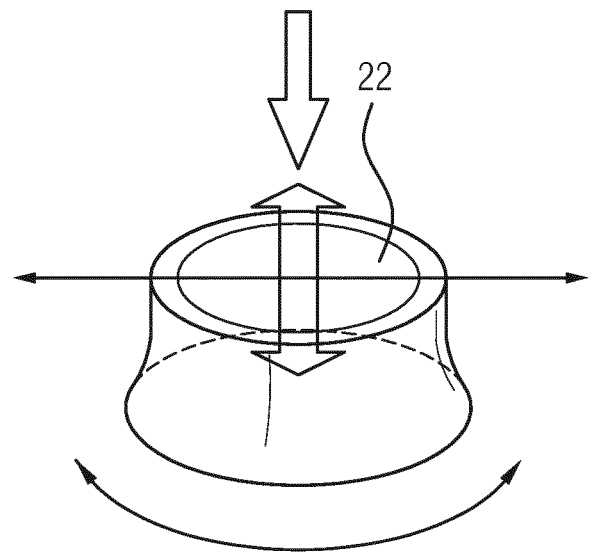
FIG. 7 shows a first input element.

Furthermore, a selection field 18 for selecting and retrieving entertainment contents (entertainment) is displayed in a central region on the first display page 1 and a selection field 20 for selecting and retrieving a connection to a mobile device is displayed in a region which is on the right in the center. The selection fields 18, 20 are chosen and the selection and retrieval are carried out by an input element 22 illustrated in a simplified manner in FIG. 7, The input element 22 is a rotary/push-in controller that can be actuated in the transverse and longitudinal directions and in the axial direction and also in a rotary manner.

Figure 2:
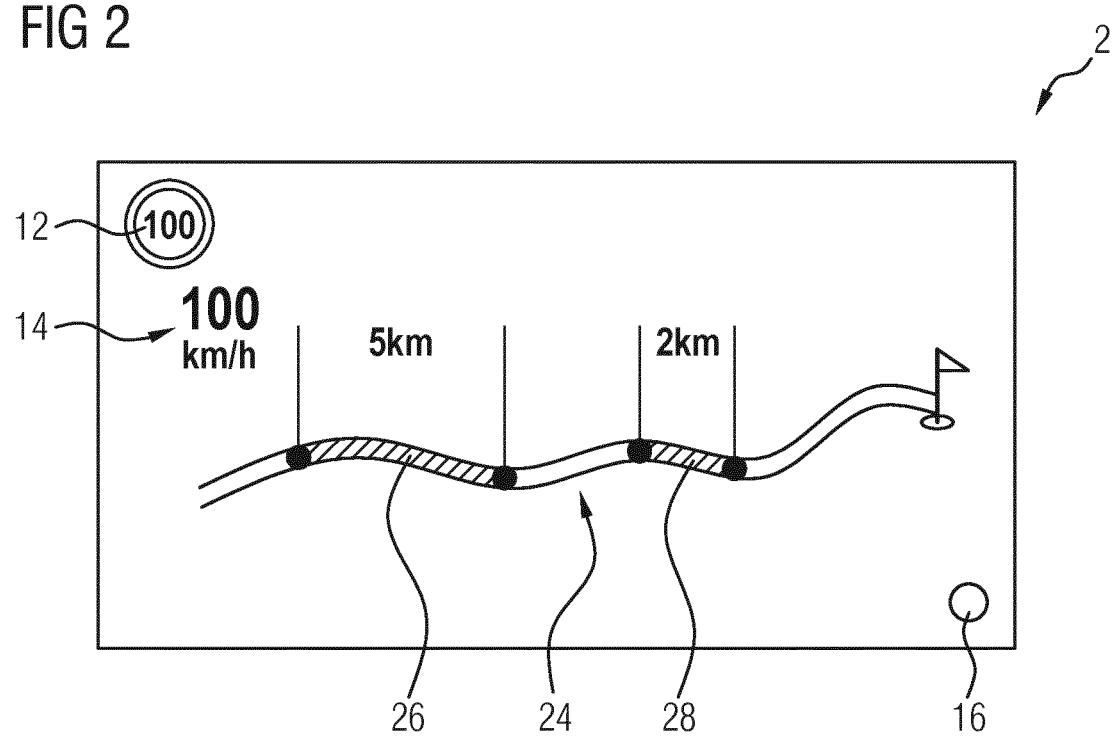
FIG. 2 shows a second display page displayed on the display apparatus.

A second display page 2, illustrated in FIG. 2, is assigned to a road map information class. An item of journey-relevant information relating to the driver's own route is displayed to the driver by the second display page 2. In addition to the speed symbol 12, the current driving speed of the motor vehicle in the speed display field 14 and the switched-on symbol 16, a future course of a route 24 for the motor vehicle is schematically illustrated on this display page 2 in the form of a route network map.

The course of the route 24 has two hatched route sections 26, 28 which are specially indicated. The length of the first route section 26 of these two route sections 26, 28 is 5 km, and the length of the second route section 28 is 2 km. The motor vehicle can be guided in an automated manner on these hatched route sections 26, 28 of the course of the route 24, that is to say these route sections 26, 28 are suitable for guiding the motor vehicle in an automated manner.

Figure 3:
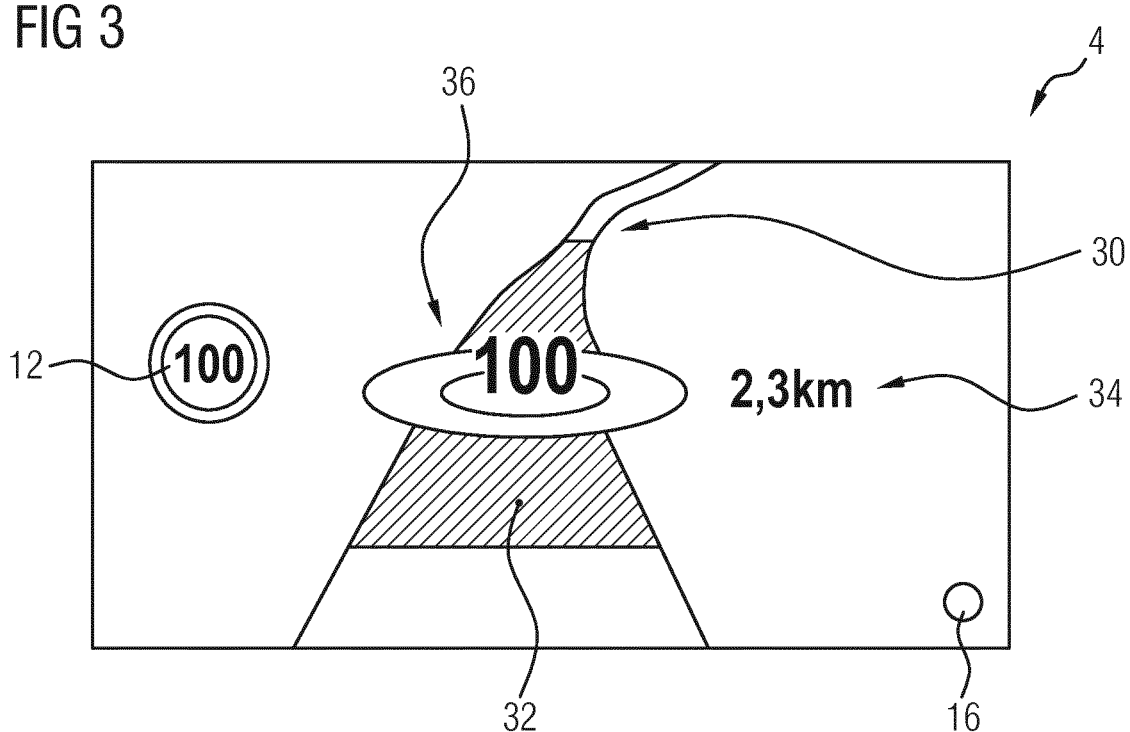
FIG. 3 shows a third display page displayed on the display apparatus.

FIG. 3 illustrates a third display page 4 which, like the second display page 2 (see FIG. 2), is assigned to the road map information class and is likewise used to display an item of journey-relevant information relating to the driver's own route to the driver. However, the third display page 4 shows an illustration which is closer to the vehicle based on the driver's own motor vehicle. In addition to the speed symbol 12 and the switched-on symbol 16, a route fragment 30 of the route currently being traveled on by the motor vehicle is centrally displayed on the third display page 4.

One route section 32 of the route fragment 30 is specially indicated and is illustrated using hatching. It is in this manner emphasized that this route section 32 is suitable for guiding the motor vehicle in an automated manner. The length of the above-mentioned route section 32 suitable for guiding the motor vehicle in an automated manner is displayed directly beside this in a route length display region 34. Furthermore, the current driving speed of the motor vehicle is displayed centrally and on the route fragment 30 in a speed display region 36 on the third display page 4.

Figure 4:
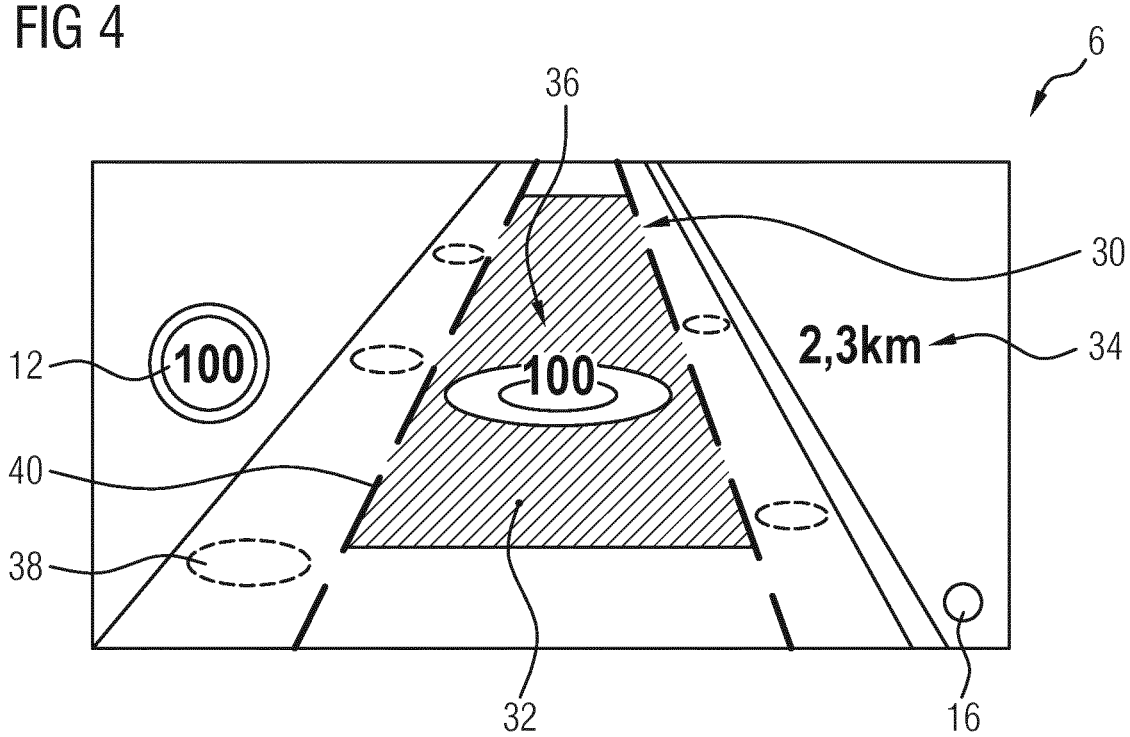
FIG. 4 shows a fourth display page displayed on the display apparatus.

A fourth display page 6 illustrated in FIG. 4 is assigned to a vehicle environment information class. An item of journey-relevant information relating to the traffic environment of the motor vehicle is displayed to the driver by the fourth display page 6. In addition to the speed symbol 12, the switched-on symbol 16, the route fragment 30, the specially indicated route section 32 suitable for guiding the motor vehicle in an automated manner, the route length display region 34 and the central speed display region 36 arranged on the route fragment 30, environment objects of the motor vehicle are displayed on the fourth display page 6.

The environment objects are situated in the traffic environment of the motor vehicle and are captured by an environment capture device of the motor vehicle. In this exemplary embodiment, road user symbols 38 for captured other road users and road marking symbols 40 for captured road markings are displayed on the fourth display page 6.

Figure 5:
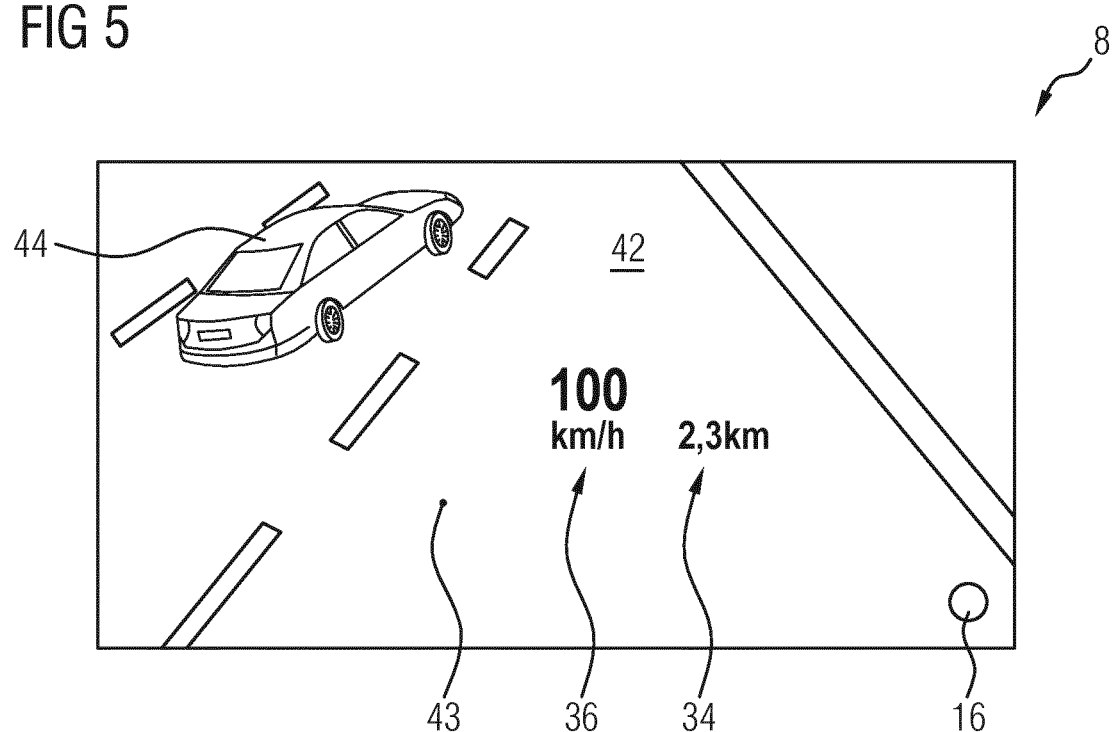
FIG. 5 shows a fifth display page displayed on the display apparatus.

FIG. 5 illustrates a fifth display page 8 which, like the fourth display page 6 (see FIG. 4), is assigned to the vehicle environment information class and is likewise used to display an item of journey-relevant information relating to the traffic environment of the motor vehicle to the driver. As an important difference to the display on the fourth display page 6, the fifth display page 8 shows an illustration closer to the vehicle based on the driver's own vehicle, wherein a further special feature is that a camera image 42 of the vehicle environment of the motor vehicle is displayed on the fifth display page 8.

The camera image 42 is recorded by an exterior camera of the motor vehicle and has, for example, a different road user 44 in the traffic environment of the motor vehicle and a road 43. The current driving speed of the motor vehicle is displayed in the speed display region 36 and the length of the route section, which is suitable for guiding the motor vehicle in an automated manner and is currently being traveled on by the motor vehicle, is also displayed in the route length display region 34 in the camera image 42.

Figure 6:
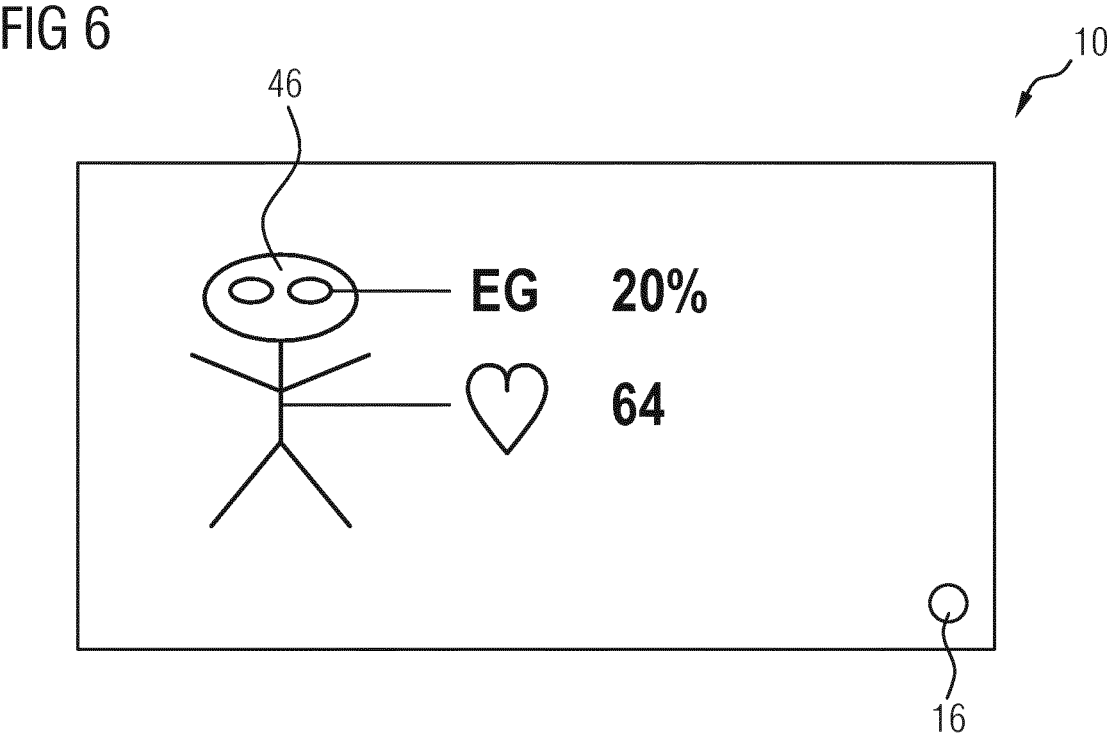
FIG. 6 shows a sixth display page displayed on the display apparatus.

A sixth display page 10 illustrated in FIG. 6 is assigned to a driver information class. An item of journey-relevant information relating to the driver himself is displayed to the driver by means of the sixth display page 10. In addition to the switched-on symbol 16, a driver symbol 46 is displayed on the sixth display page 10 for this purpose.

A first item of driver condition information EG, which represents a current degree of fatigue of the driver, and a second item of driver condition information, which is symbolized by a heart symbol and represents a current heart rate of the driver, are displayed in a manner assigned to the driver symbol 46. The displayed degree of fatigue of the driver is 20% here, and the heart rate is 64 beats per minute. A driver condition of the driver is captured by a driver condition capture device of the motor vehicle, and the driver condition information indicates the driver condition.

The above-mentioned display pages 1, 2, 4, 6, 8, 10 are displayed sequentially and in the stipulated order: first display page 1, second display page 2, third display page 4, fourth display page 6, fifth display page 8, sixth display page 10. The sixth display page 10 is followed by a continuation with the first display page 1. In this case, it is possible to scroll through the display pages 1, 2, 4, 6, 8, 10 both in a forward direction and in a reverse direction.

Figure 8:
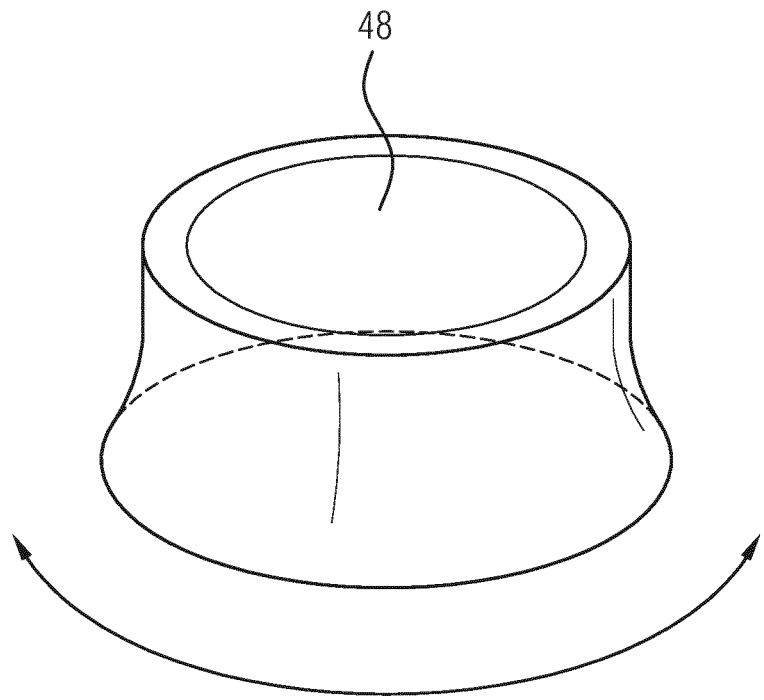
FIG. 8 shows a second input element.

A change from the display page currently displayed on the display apparatus to an adjacent display page in the order is effected by actuating a second input element 48 which is illustrated in a simplified manner in FIG. 8. The second input element 48 is a rotary controller which can be actuated in a rotary manner.

For example, if the third display page 4 (see FIG. 3) is currently displayed, the second display page 2 (see FIG. 2) is then displayed if the second input element 48 is rotated to the left. In contrast, if the second input element 48 is rotated to the rights the fourth display page 6 (see FIG. 4) would then be displayed starting from the third display page 4.

Starting from the first display page 1 (assigned to the infotainment information class), via the second display page 2 (assigned to the road map information class), the third display page 4 (assigned to the road map information class), the fourth display page 6 (assigned to the vehicle environment information class), the fifth display page 8 (assigned to the vehicle environment information class) and the sixth display page 10 (assigned to the driver information class), zooming is carried out from a display containing comparatively few items of journey-relevant information, via a comparatively large-scale display, into the driver (sixth display page 10). Accordingly, the first display page 1 can also foe referred to as zoom level 1, the second display page 2 can be referred to as zoom level 2, the third display page 4 can be referred to as zoom level 3, the fourth display page 6 can be referred to as zoom level 4, the fifth display page 8 can be referred to as zoom level 5 and the sixth display page 10 can be referred to as zoom level 6.

The transition or change from one display page to the following display page in the case of the sequential display of the display pages can preferably be carried out in a flowing manner. The transitions between the zoom levels can therefore be flowing.

When guiding the motor vehicle in an automated manner, the third display page 4 or zoom level 3 is preferably preset, that is to say this display page 4 or zoom level 3 is displayed as standard without actuating the second input element 48, If the motor vehicle is not guided in an automated manner— for example in a route section not suitable for guiding the motor vehicle in an automated manner—that is to say the motor vehicle is guided solely by the driver in a manual driving mode, the second display page 2, the third display page 4, the fourth display page 6 and the sixth display page 10 can be used in a method similar to the method described above but does not take into account the first display page 1 and the fifth display page 8.

Figure 9:
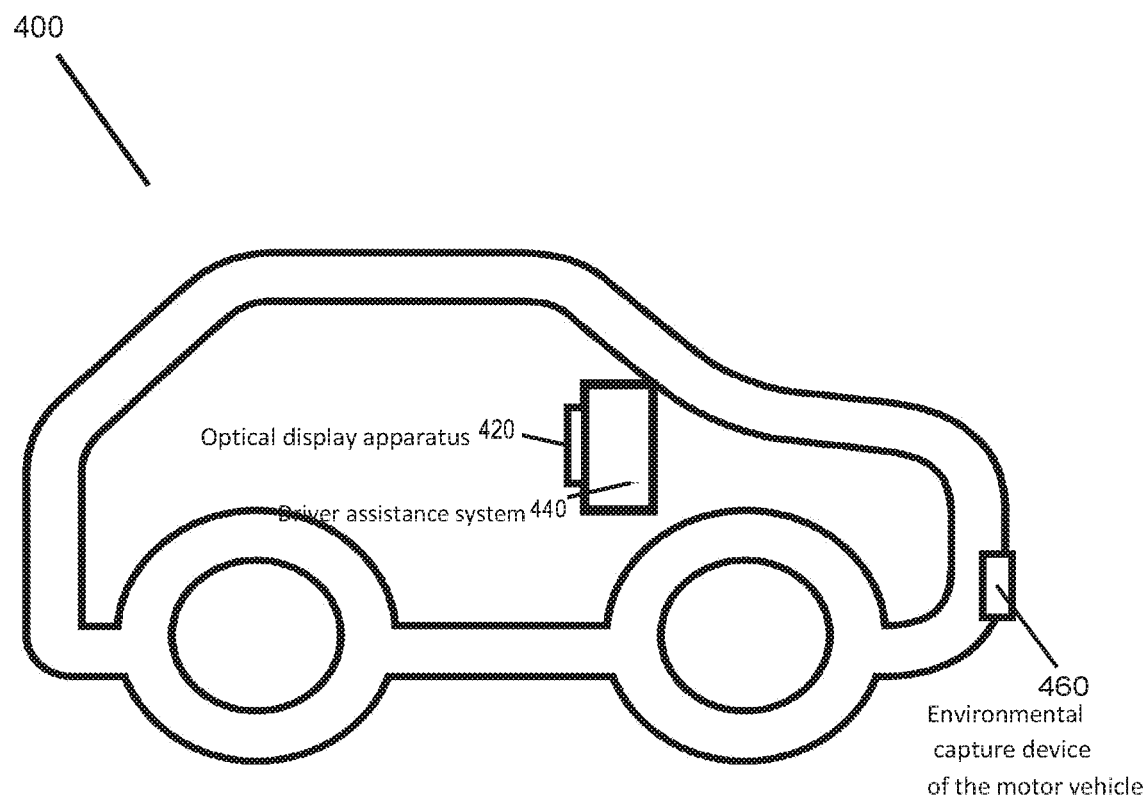
FIG. 9 is a diagram showing a motor vehicle having an optical display apparatus, a driver assistance system and an environmental capture device of the motor vehicle.

FIG. 9 is a diagram showing a motor vehicle 400 having an optical display apparatus 420, a driver assistance system 440 and an environmental capture device 460 of the motor vehicle.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for guiding a motor vehicle occupied by a driver during a vehicle journey in an automated manner by a driver assistance system, comprising:

displaying, on an optical display apparatus of the driver assistance system, to the driver information from the driver assistance system relevant to the journey;

displaying the information relevant to the journey on the optical display apparatus by a plurality of different display pages (1, 2, 4, 6, 8, 10) assigned to different information classes;

capturing, by an environment capture device of the motor vehicle, environment objects in a traffic environment of the motor vehicle, the captured environment objects including other road users and road markings;

and displaying the captured environment objects on the optical display apparatus, as road user symbols for captured other road users and as road marking symbols for road markings, on a display page (6, 8) of sequentially displayed display pages (1, 2, 4, 6, 8, 10), wherein the display pages (1, 2, 4, 6, 8, 10) are displayed sequentially and in a stipulated order, and wherein the number of sequentially displayed pages comprises at least three sequentially displayed display pages, wherein one display page (2; 4) of the at least three display pages is assigned to a road map information class, another display page (6; 8) of the at least three display pages is assigned to a vehicle environment information class, and a further display page (10) of the at least three display pages is assigned to a driver information class, wherein the display page (2; 4)

assigned to the road map information class is arranged first in the stipulated order of the display pages, followed by the display page (6; 8) assigned to the vehicle environment information class and then by the display page (10) assigned to the driver information class.

2. The method as claimed in claim 1, further comprising:
changing, by actuation of an input element (48), from the display page (1, 2, 4, 6, 8, 10) displayed on the display apparatus to an adjacent display page (1, 2, 4, 6, 8, 10) in the stipulated order.

3. The method as claimed in claim 1, further comprising:
capturing, by a driver condition capture device of the motor vehicle, a driver condition of the driver; and
displaying the driver condition on the optical display apparatus on the display page (10) of the sequentially displayed display pages (1, 2, 4, 6, 8, 10).

4. A motor vehicle for carrying out the method as claimed in claim 1, the motor vehicle comprising:
the driver assistance system configured to guide the motor vehicle in an automated manner; and
the optical display apparatus,
wherein the driver assistance system is connected to the optical display apparatus and configured to transmit data, and the optical display apparatus is configured to:
display the information relevant to the journey from the driver assistance system by the plurality of different display pages (1, 2, 4, 6, 8, 10) assigned to different information classes, and
display the display pages (1, 2, 4, 6, 8, 10) sequentially and in the stipulated order.

\* \* \* \* \*